United States Patent
Glovatsky et al.

(10) Patent No.: US 6,705,671 B1
(45) Date of Patent: Mar. 16, 2004

(54) ELECTRONICALLY INTEGRATED VEHICLE SUPPORT STRUCTURE

(75) Inventors: Andrew Z. Glovatsky, Plymouth, MI (US); Daniel R. Vander sluis, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/292,553

(22) Filed: Nov. 12, 2002

(51) Int. Cl.[7] ............................................. B60K 37/00
(52) U.S. Cl. .................... 296/193.02; 296/70; 174/254; 174/117 FF; 361/749
(58) Field of Search ............................. 296/193.02, 70, 296/146.7, 208, 901.01; 174/251, 254, 268, 117 F, 117 FF; 361/749, 750, 751; 180/90

(56) References Cited

U.S. PATENT DOCUMENTS

| | | | |
|---|---|---|---|
| 5,324,203 A | * | 6/1994 | Sano et al. .................... 439/34 |
| 5,354,114 A | | 10/1994 | Kelman et al. |
| 5,712,764 A | | 1/1998 | Baker et al. |
| 5,715,140 A | * | 2/1998 | Sinkunas et al. ........... 361/690 |
| 5,823,602 A | | 10/1998 | Kelman et al. |
| 6,048,020 A | * | 4/2000 | Gronowicz et al. ........... 296/70 |
| 6,095,272 A | * | 8/2000 | Takiguchi et al. ............ 180/90 |
| 6,250,706 B1 | | 6/2001 | Davis, Jr. et al. |
| 6,276,739 B1 | | 8/2001 | Wich |
| 6,344,613 B1 | * | 2/2002 | Kolodziej ................. 174/72 A |
| 6,371,551 B1 | | 4/2002 | Hedderly |
| 6,505,876 B1 | * | 1/2003 | Watanabe ..................... 296/70 |
| 2002/0017798 A1 | * | 2/2002 | Shikata et al. ................. 296/70 |
| 2003/0057731 A1 | * | 3/2003 | Drewniok et al. ........ 296/146.7 |
| 2003/0080582 A1 | * | 5/2003 | Gibney et al. ........... 296/146.7 |
| 2003/0094831 A1 | * | 5/2003 | Kondo et al. ................. 296/70 |

* cited by examiner

Primary Examiner—D. Glenn Dayoan
Assistant Examiner—Patricia L. Engle
(74) Attorney, Agent, or Firm—Brinks Hofer Gilson & Lione

(57) ABSTRACT

An integrated vehicle structure combines the mechanical and electrical systems of the vehicle. The integrated vehicle structure generally comprises a vehicle support structure, a flatwire extending along the vehicle support structure, and an electronic site incorporated to the flatwire. Preferably, the electronic site is supported directly on the vehicle support structure, and is a flexible circuit board. Alternately, the electronic site can be a rigid circuit board. Most preferably, the electronic site is integrally formed with the flatwire. The vehicle support preferably comprises a cross-car beam, which includes both metal and plastic components.

20 Claims, 6 Drawing Sheets

ELECTRONICALLY INTEGRATED VEHICLE SUPPORT STRUCTURE

FIELD OF THE INVENTION

The present invention relates generally to electrical interconnection of electronic components of a vehicle, and more particularly relates to integration of the electrical interconnecting media and components into the vehicle support structure.

BACKGROUND OF THE INVENTION

Typically, vehicles house a plurality of electronic components which must be properly wired. For example, instrument panels typically include instrument cluster gages, air-conditioning controls, radios, navigation systems, lighters, airbags, reading lights, and other similar devices. Generally, these electronic components each include their own housing, which is typically a large metal box. These boxes or housings provide structural support to the electrical devices and modular mounting within the vehicle. Further, the boxes may also include the provision of a human machine interface (HMI) such as the control for the radio or the like.

All of these electronic devices must be provided with power which is typically accomplished by a wire harness positioned within the vehicle, typically packaged within the instrument panel. Usually, a wire harness is made with a plurality of pigtails having an electrical connector disposed at one end for connection to an electrical device such as one referenced above. Unfortunaly, as the electronic devices increase in the instrument panel, so does the complexity of the wire harness. The complexity of the wire harness, as well as the large size and weight of the boxes housing the components, lead to larger assembly cost, weight and difficulty in packaging.

Accordingly, there exists a need for an electrical interconnection solution for the electronic devices of a vehicle that is easy to assemble and minimizes the size and weight of the whole system, while still providing adequate support to the electronic devices.

BRIEF SUMMARY OF THE INVENTION

The present invention provides an integrated vehicle structure combining the mechanical and electrical systems of the vehicle. Generally, the integrated vehicle structure comprises a vehicle support structure, a flatwire or flexible circuit extending along the vehicle support structure, and an electronic site incorporated to the flatwire. As used herein, flatwire, flatwire bus and flatwire circuit are used interchangeably and refer generally to flat flexible cable, also known as ribbon cable and printed flex cable. The electronic site is supported on the vehicle support structure and does not require a separate housing. In this manner, the vehicle support structure mechanically supports the electronic site, as well as provides thermal dissipation of heat from the electronic site, thereby providing cooler electronics. Furthermore, this allows for a minimization of the volume and reduces the electronic weight in the instrument panel by eliminating the need for individual electronic module housings and bracketry. The use of flatwire rather than a traditional wire harness also reduces the weight of the system. Finally, connectors and some pigtails are also eliminated to further reduce costs, weight and to provide easier assembly. Flatwire also provides additional flexibility in terms of shaping the electrical system to conform with the mechanical support structure of the vehicle.

Preferably, the electronic site is supported directly on the vehicle support structure, and is a flexible circuit board. Alternately, the electronic site can be a rigid circuit board. Preferably, the electronic site is integrally formed with the flatwire. The vehicle support preferably comprises a cross-car beam, which includes both metal and plastic components. A connector may be utilized to electrically link the flatwire to an actuator or sensor. Additionally, a flatwire tail may be used to electrically link the electronic site to a human machine interface (HMI) or actuator or sensor. A number of different fasteners may also be utilized to retain the flatwire and electronic component on the vehicle support structure.

DETAILED DESCRIPTION OF THE INVENTION

Figure 1:
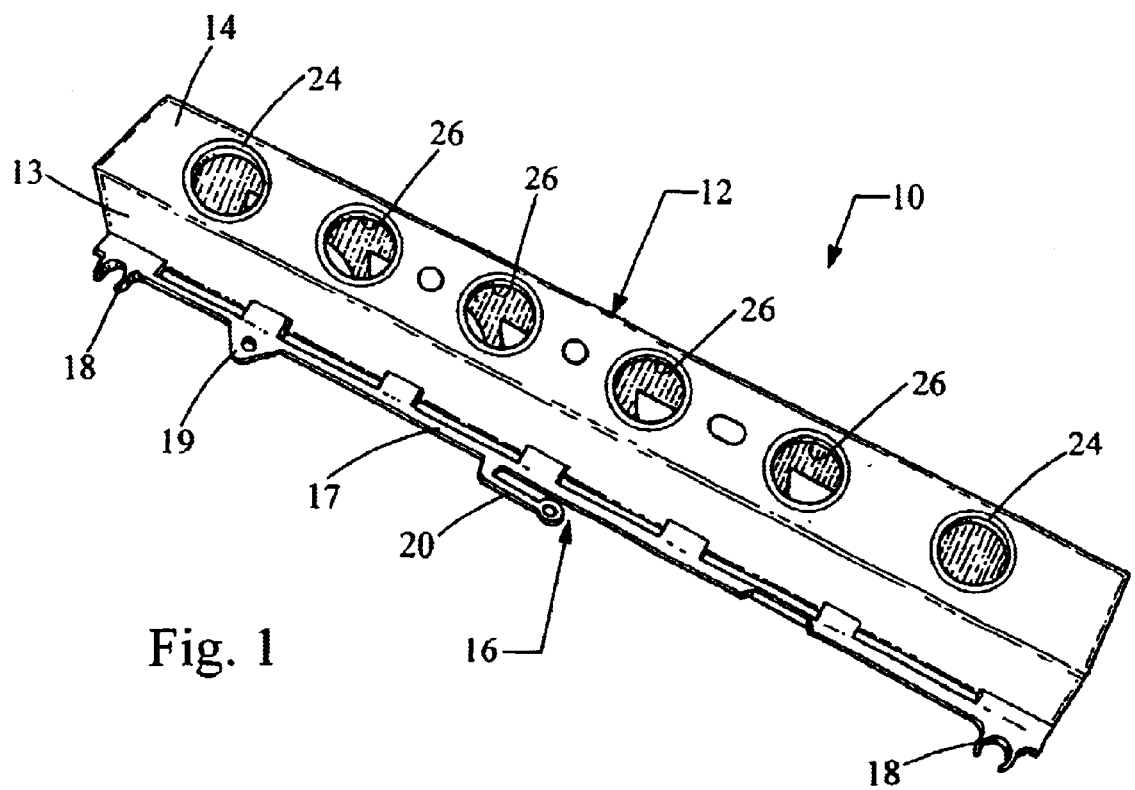
FIG. 1 is a perspective view, taken from the front and right, of a vehicle support structure.
Figure 2:
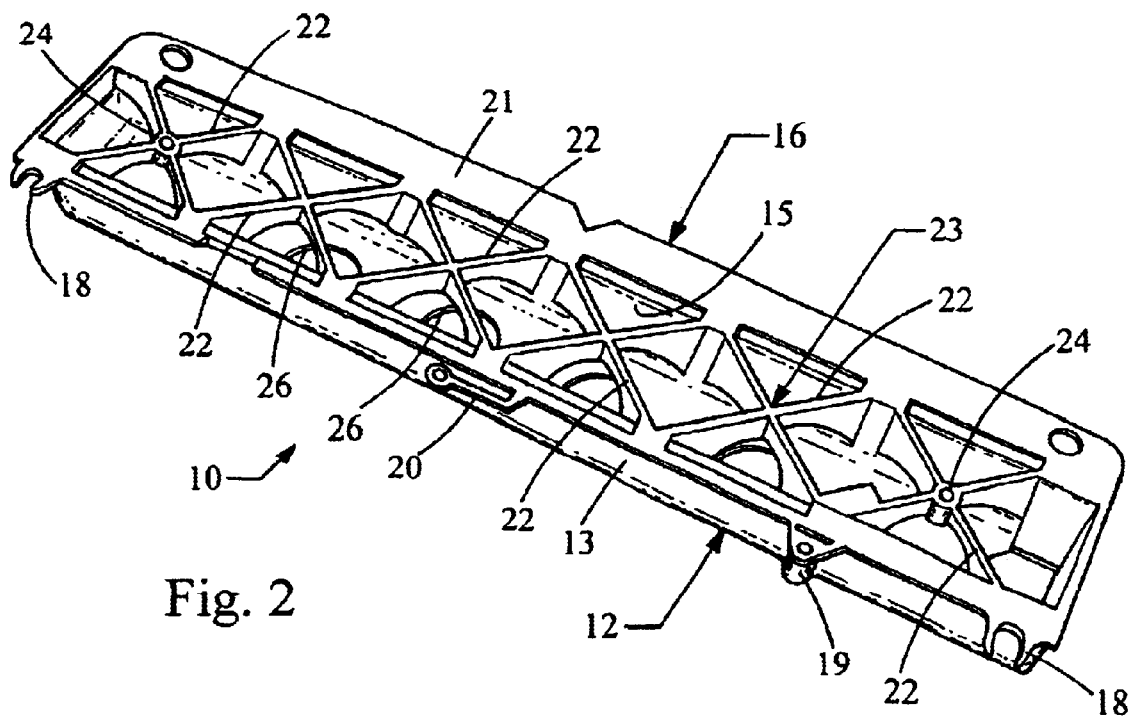
FIG. 2 is a perspective view, taken from the rear and right, of the vehicle support structure shown in FIG. 1.

Turning now to the figures, FIGS. 1 and 2 depict a simplified vehicles support structure 10 which can be utilized by the present invention. The simplified vehicle support structure 10 has been illustrated for purposes of explaining the present invention. The support structure 10 is a hybrid structure, meaning it generally includes a metal component 12 and a plastic component 16. The metal component 12 comprises a C-shape channel formed by side walls 13 and 15 which are linked by top wall 14. The plastic component 16 is sized and constructed to cooperate with the metal component 12. As best seen in FIG. 2, the plastic component 16 includes a support web 23 defined by a plurality of criss-crossing ribs 22. The support web 23 fits within the C-shaped channel of the metal component 12. The plastic component 16 also includes a plate 21 extending beyond the sidewall 15, and similarly includes a bar 17 extending beyond the sidewall 13. The bar 17 includes various attachment features such as clips 18, 19, 20. The support web 23 defines attachment holes 24 which work in cooperation with the metal component 12 and its top wall 14. Similarly, the plastic component 16 and the metal component 12 work in combination to define pass-thru holes 26 which extend through the top wall 14.

Figure 3:
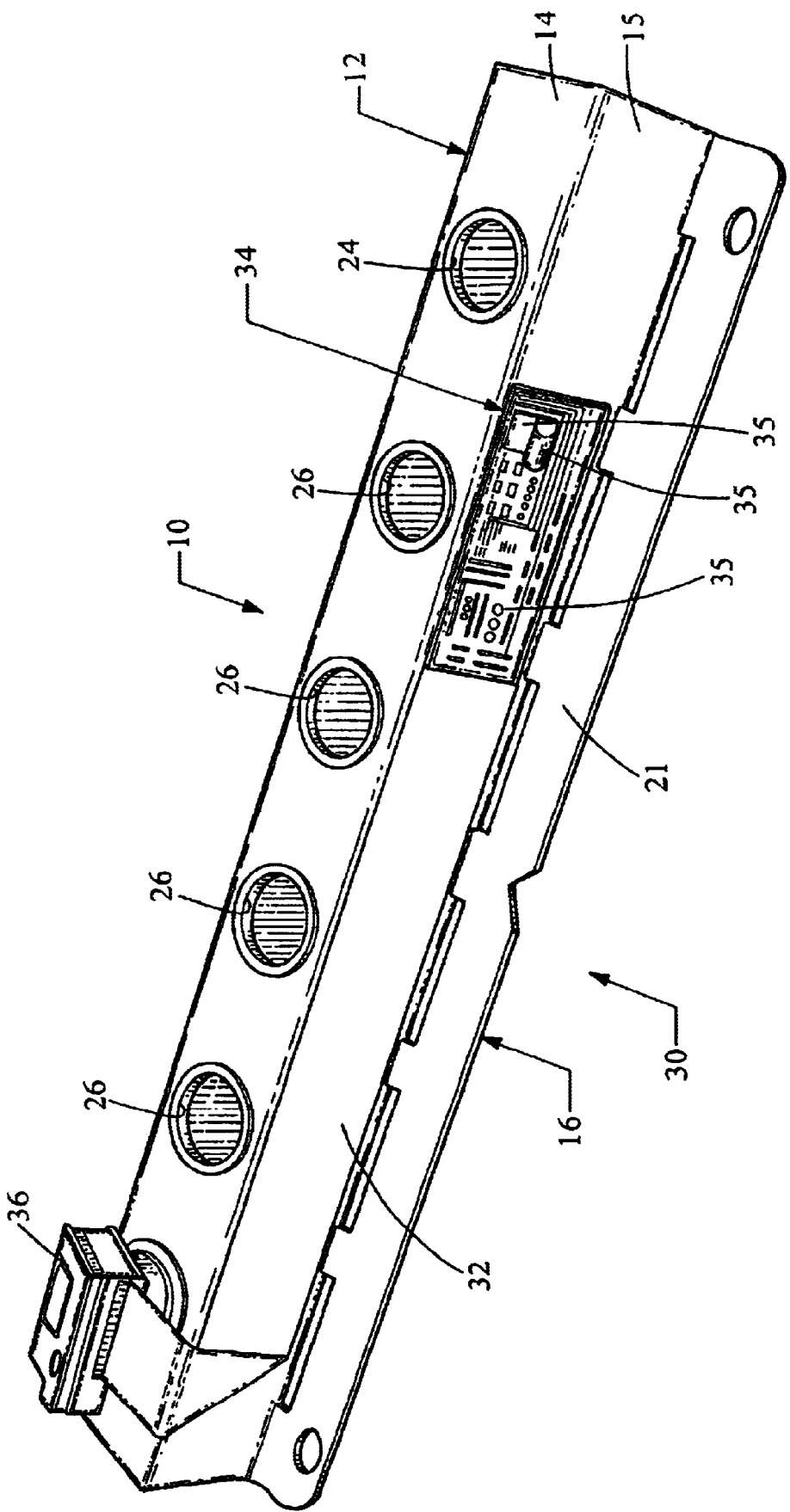
FIG. 3 is a perspective view of an integrated vehicle structure incorporating the vehicle support structure shown in FIGS. 1 and 2, constructed in accordance with the teachings of the present invention.

The present invention utilizes this vehicle support structure 10 in forming an integrated vehicle structure 30, as shown in FIG. 3. The integrated structure 30 incorporates an electronic site 34 directly onto the support structure 10. Likewise, a flatwire 32 electrically connects the electronic site 34 to the appropriate devices within the vehicle. For example, FIG. 3 depicts the electronic site 34 connected by way of flatwire 32 to a connector 36, which in turn is structured to be connected to an actuator (not shown) operated by the electronic site 34.

The electronic site 34 includes various electronic components 35 such as integrated circuits, resistors, capacitors, inductors, and the like. The electronic site 34 can be used to operate another device within the vehicle, or itself can represent a stand-alone device such as radio. The electronic site 34 may be a flexible circuit board which, like the flatwire 32, has the flexibility to adapt to the shape of any given vehicle support structure. Alternately, the electronic site may be a rigid circuit board. Preferably, the electronic site 34 is integrally formed with the flatwire 32 as a single unit constructed with a common substrate formed of a flexible polymer.

Importantly, the electronic site 34 is supported directly on the vehicle support structure 10, and more particularly the sidewall 15. First, this eliminates the need for a large metal box to support the electronic site 34, as well as multiple pigtails and connectors, thereby reducing volume and weight while providing for easier assembly. Further, the flatwire 32 can conform to the shapes and contours of the vehicle support structure 10 as necessary. Finally, by, supporting the electronic site 34 directly on the vehicle support structure 10, the electronic site 34 is provided with excellent heat transfer providing for cooler electronics. This is especially true when the metal component 12 of the support structure 10 is utilized as shown in FIG. 3.

Figure 4:
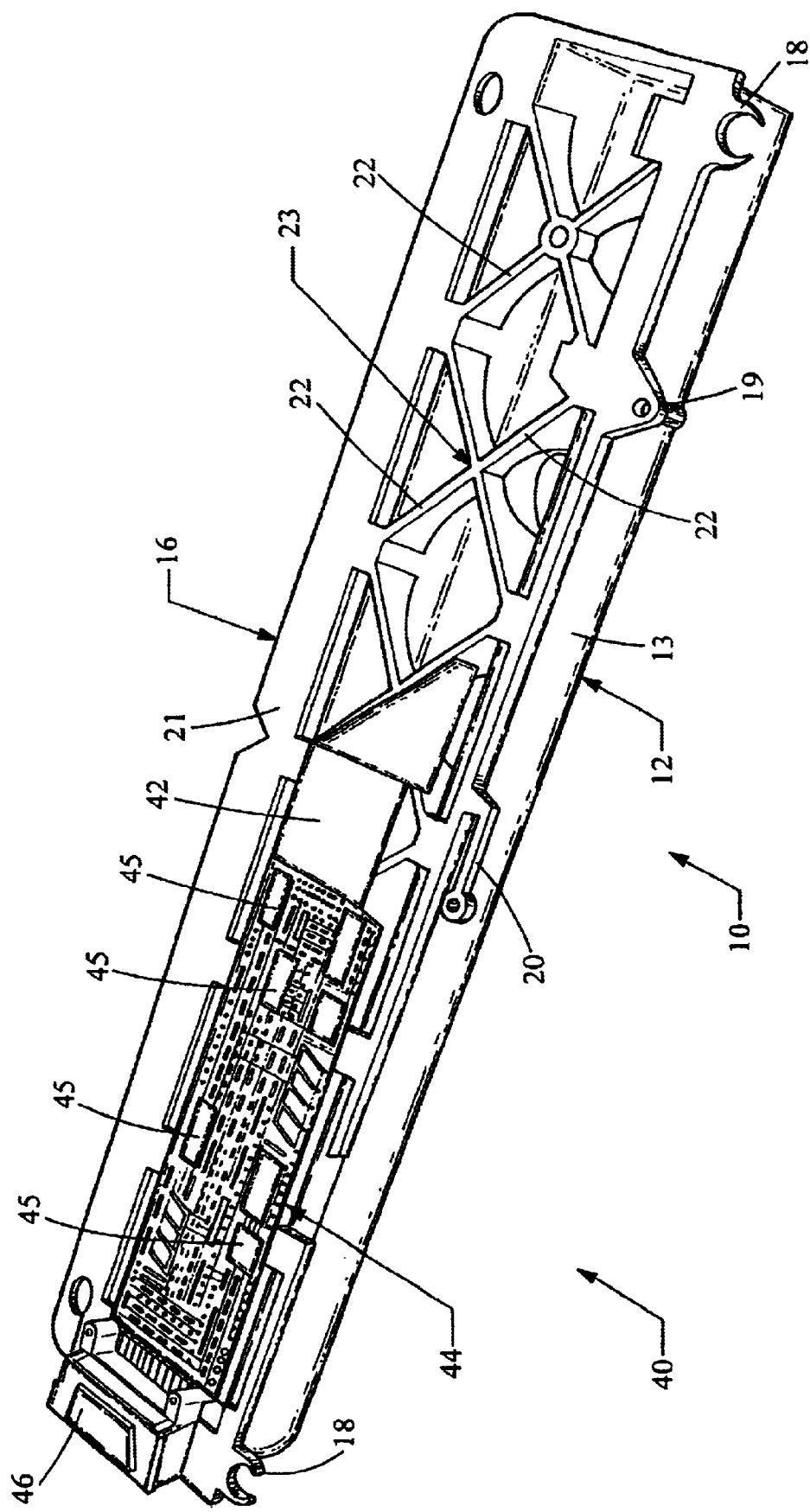
FIG. 4 is a perspective view of another embodiment of an integrated vehicle structure incorporating the vehicle support structure shown in FIGS. 1 and 2, constructed in a accordance with the teachings of the present invention.

An alternate embodiment of the integrated vehicle structure 40 is shown in FIG. 4. In this embodiment, the same vehicle support structure 10 is utilized as was in the prior embodiment, and as shown in FIGS. 1 and 2. However, in this embodiment an electronic site 44 is supported on the plastic component 16 of the support structure 10. More specifically, the electronic site 44 is supported directly on the support web 23 and its ribs 22. Likewise, the flatwire 42 is connected directly to the electronic site 44 and extends along the support web 23 as necessary. Additionally, the connector 46 is attached directly to the electronic site 44 for electrically linking the electronic site 44 to an actuator (not shown). As in the previous embodiment, the electronic site 44 has a plurality of electronic components 45 for controlling or forming a device within the vehicle.

Therefore, it will be seen that the electronic site and the flatwire can be incorporated directly on the vehicle support structure, whether it be a plastic component 16 as shown in FIG. 3, or a metal component 12 as shown in FIG. 4. This not only eliminates the metal housing to hold the electronic site, but also eliminates the extra wiring and connectors often required for such mounting of the electronic component within the vehicle. This will be more fully illustrated in FIGS. 5 and 6.

Figure 5:
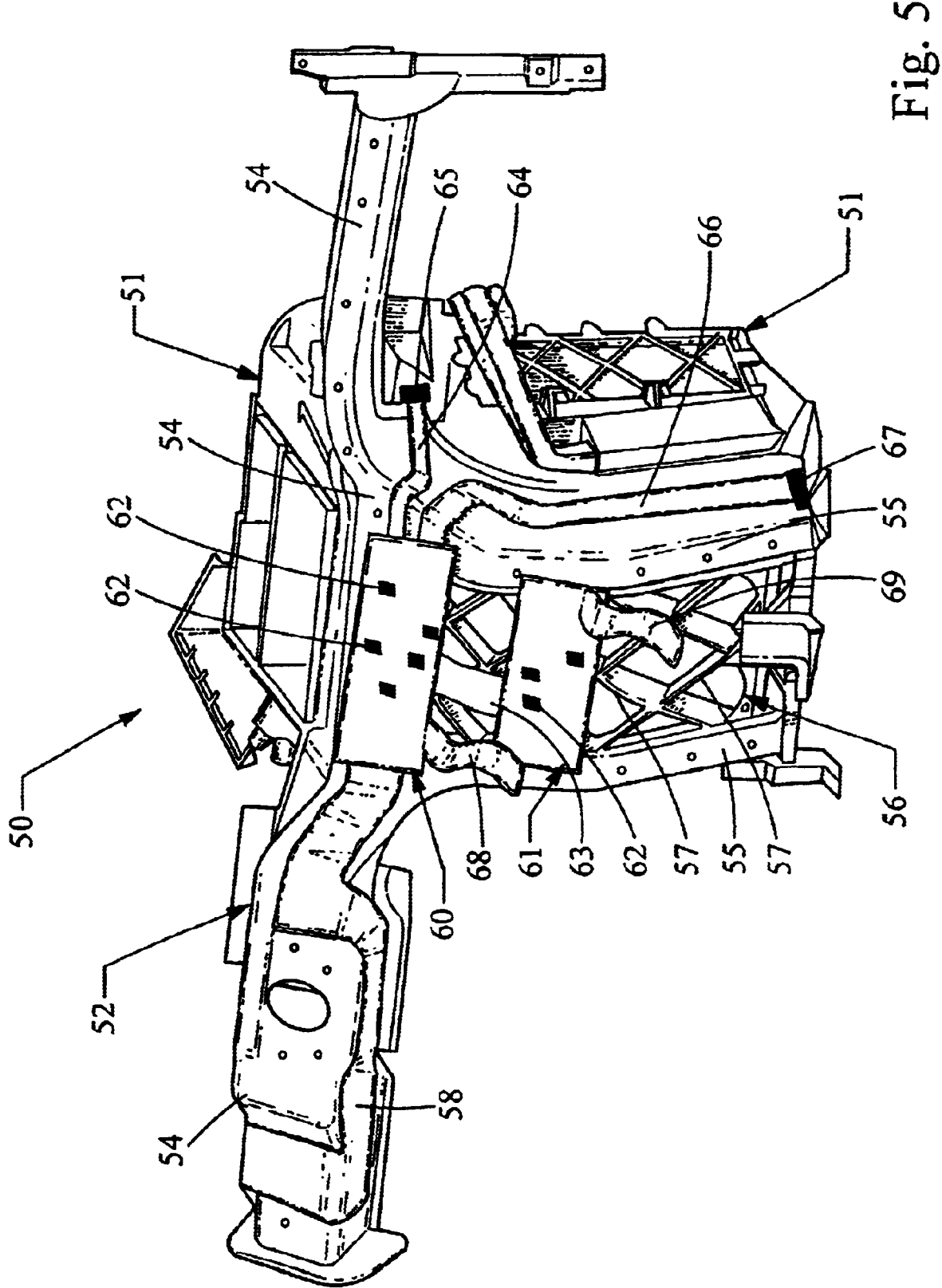
FIG. 5 is a perspective view of yet another embodiment of an integrated vehicle structure constructed in accordance with the teachings of the present invention.

Turning now to FIG. 5, yet another embodiment of an integrated vehicle structure 50 is shown constructed in accordance with the present invention. Again, the integrated structure 50 includes a vehicle support structure 52, which here includes a cross-car beam 54. Generally, the cross-car beam 54 is utilized for structural support to the cockpit or instrument panel of the vehicle. As shown in FIG. 5, the cross-car beam 54 also includes two downwardly depending legs 55, which in combination support a heating ventilation and air conditioning (HVAC) unit 51. The details of the HVAC unit 51 will not be described here, but suffice it to say that it is supported by the vehicle support structure 52. The vehicle support structure 52 in the present case is also a hybrid structure including both metal components such as the cross-car beam 54, as well as a plastic component which includes a support web 56 having a plurality of crisscrossing ribs 57.

In this embodiment of the integrated structure 50, two electronic sites 60, 61 are supported on the vehicle support structure 52. It can be seen in FIG. 5 that the electronic sites 60, 61 are mounted directly on the vehicle support structure 52, and more particularly to both the metal cross-car beam 54 as well as the plastic support web 57. Each of the electronic sites 60, 61 include a plurality of electronic components 62, allowing the electronic sites 60, 61 to perform various functions. For example, the electronic site 60 may be utilized to run the HVAC system 51. As shown, the electronic site 60 is electrically connected to a first flatwire 58 which has been mounted to the cross-car beam 54 and adapt to the contours of that support structure 52. Further, the electronic site 60 is also electrically connected to flatwire strip 64 and 66, which are in turn linked to connectors 65, 67, respectively. The connectors 65, 67 form an interconnect between the electronic site 60 and the HVAC unit 51 for operating the same. More specifically, the connectors 65, 67 are linked to the actuators of the HVAC system 51, such as the compressor and evaporator.

A fourth flatwire 63 connects the first electronic site 60 to the second electronic site 61. The first and second electronic sites 60, 61 each include a flatwire tail 68, 69, respectively. The flatwire tails 68, 69, may in turn be connected to a human machine interface (HMI) (not shown) for operation of the electronic site 60, 61 and the system it is attached to, such as the HVAC system 51.

Figure 6:
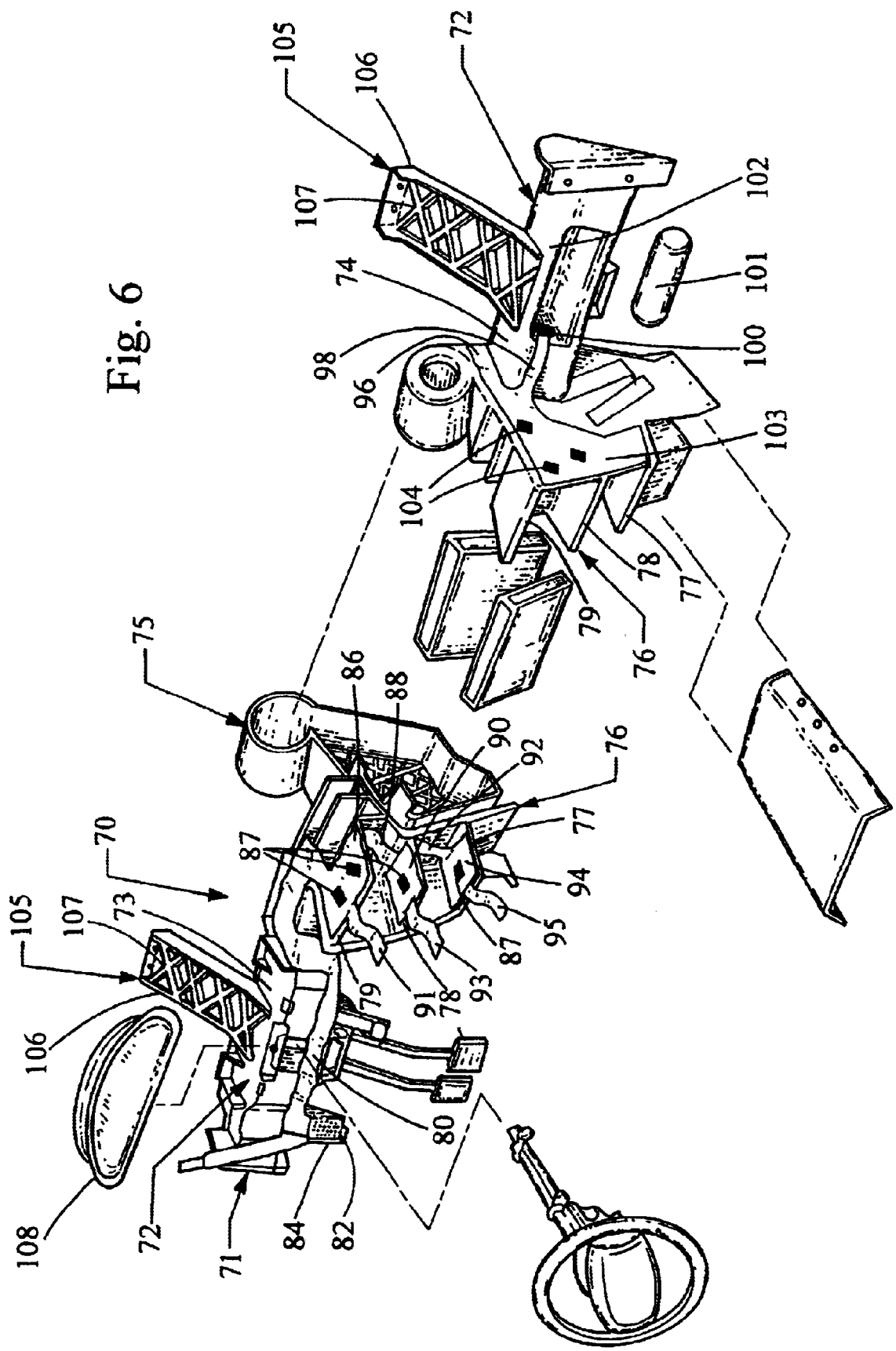
FIG. 6 is an exploded view of still another embodiment of an integrated vehicle structure constructed in accordance with the teachings of the present invention.

Still another embodiment of an integrated vehicle structure 70 is shown in FIG. 6. FIG. 6 depicts a vehicle support structure 71 for supporting the cockpit or instrument panel of a vehicle. More particularly, the support structure 71 includes a cross-car beam 72 which is typically constructed of a metal channel formed in various configurations as shown. The cross-car beam 72 includes a driver's side beam 73 integrally formed with a passenger side beam 74, which have been shown as exploded for purposes of illustration. The vehicle support structure 71 further includes an electronics housing 76 having a plurality of shelves 77, 78, 79 which are typically utilized for housing an electronics box such as the radio and climate control electronics. Another HVAC unit 75 has been shown, also exploded. The vehicle support structure 71 further includes various additional support structures such as left and right supports 105 which include a metal channel 106 having a plastic support web 107 extending therebetween. For example, the left hybrid support 105 is utilized to physically support the instrument cluster 108 in a viewable position.

The integrated vehicle structure 70 further includes the appropriate electronics, including a first flatwire 80 extending along the face of the cross-car beam 72. The flatwire 80 is connected to both a fuse panel 82, as well as a junction block 84. The junction block 84 links the flatwire 80 to the wires extending from under the hood of the vehicle, which provides such information as remaining fuel, speed, battery charge, coolant temperature and other sensors that provide an input for the instrument cluster 108, as well as the lines back to actuators from the cockpit.

The flatwire 80 is adapted to the contours of the cross-car beam 72 and connects to a first electronic site 86. The electronic site 86 includes various electrical components 87 for performing a specified function. The first electronic site 86 is adapted to lie flat on the shelf 79 of the electronics housing 76. A second flatwire 88 links a first electronic site 86 to a second electronic site 90. The second electronic site 90 is supported on shelf 78. Again, the second electronic site 90 includes various electronic components 87. Further, a third flatwire 92 links the second electronic site 90 to a third electronic site 94 also having various electronic components 87. The third electronic site 94 is supported on shelf 77. The first, second and third electronic sites 86, 90, 94 can be utilized to operate or form various devices within the vehicle, such as climate control (HVAC), radio, compact disc player, television, navigation, or any electronic device desired to be placed within the vehicle. Flatwire tails 91, 93, 95 link the three electronic sites 86, 90, 96 to human machine interfaces (not shown) for operation of those devices.

Moving now to the passenger side portion 74 of the cross-car beam 72 and the passenger side of the electronics housing 76, a fourth electronic site 103 is shown having various electronic components 104. The fourth electronic site 103 includes a flatwire 96 for connection to either the first flatwire 80 or one of the three electronic sites 86, 90, 94. Further, another flatwire 98 links the electronic site 103 to a connector 100. The connector 100 can be used to form an interconnect with an actuator. For example, the actuator could be a light in the glove compartment, or alternately could be an actuator for an airbag 101 that can be positioned within a pocket 102 formed in the cross-car beam 72.

Accordingly, FIG. 6 illustrates that by utilizing both flatwire and electronic sites incorporated into the flatwire, the electrical system may be integrated into the vehicle support structure which provides thermal and mechanical support thereto. By supporting the electronic site directly on the vehicle support structure, assembly is made much simpler and the system can conform to the particular contours of the vehicle support structure which can be non-planar. Furthermore, the heavy metal housings or boxes typically utilized to hold the electronic components are eliminated, as well as the pigtails and additional connectors required therefore, thereby reducing volume and weight of the electronics while providing increased flexibility and easier assembly.

While two simple integrated vehicle structures have been shown in FIGS. 3 and 4, and two more specific integrated structures shown in FIGS. 5 and 6, it will be recognized that the number of variations on the present invention are infinite and vary according to the number of electronics and electronic sites required in a vehicle, as well as the physical shape and contours of a vehicle support structure which typically include both metal and plastic components. For example, the incorporation of flatwire and electronic sites into a vehicle support structure can be applied outside of the instrument panel, such as in the engine compartment of the vehicle. The flatwire and electronic sites used in the present invention may be incorporated onto either or both of the metal and plastic components forming a portion of the vehicle support structure.

Figure 7A:
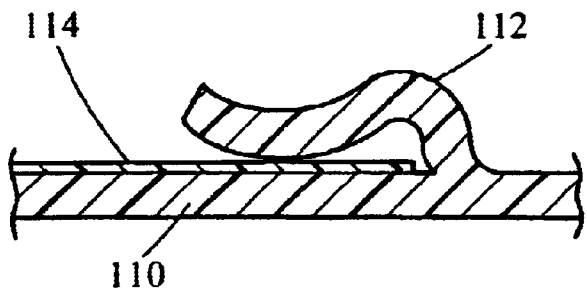
FIGS. 7a–7e are cross-sectional views showing different embodiments of fasteners for utilization with the integrated vehicle structure shown in FIGS. 1–6.

Turning now to FIGS. 7a–7e, various fasteners are shown for attaching the flatwire and electronic sites to the vehicle support structure. While either tape, hook and loop fasteners, adhesives or other similar fasteners may be used, a few preferred fastening methods and structures of the mechanical-type have been depicted. In FIG. 7a, a single clip 112 has been shown as Integrally molded into a plastic portion of the vehicle support structure 110. Preferably, the clips 112 are constructed of a resilient material that are biased downwardly to hold a flatwire or electronic site 114 against the support structure 110. It will be recognized that the clip 112 can also be constructed of metal depending on the material of the support structure 110.

Figure 7B:
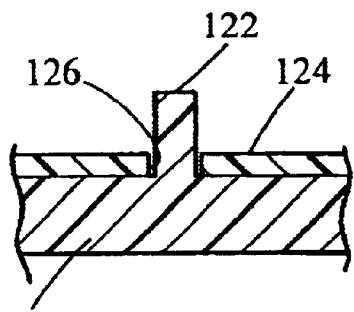
Figure 7C:
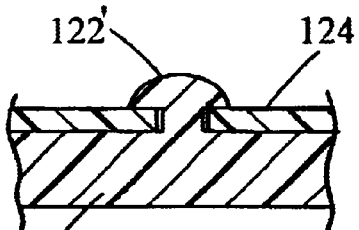

As shown in FIG. 7b, the support structure 120 may be integrally formed with a projection 122. The projection 122 is preferably sized and positioned to correspond to a preformed hole 126 in the flatwire or electronic site 124. In this case, the projection 122 may further be heat staked or otherwise deformed to form a button 122 (FIG. 7c) for securely fastening the flatwire or electronic site 124.

Figure 7D:
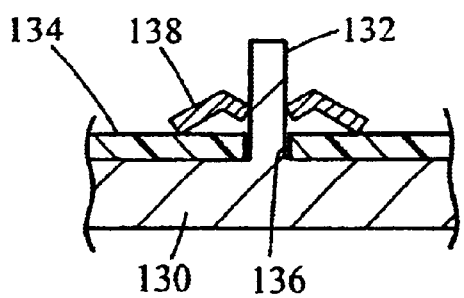
Figure 7E:
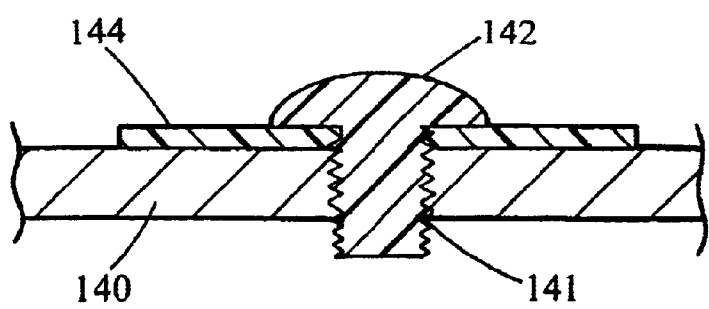

Another preferred fastener is shown in FIG. 7d, which is similar to the prior embodiment where the vehicle support 130 included a projection 132. Again, the projection 132 is sized and positioned to correspond to a preformed hole 136 in the flatwire or electronic site 134. Here, a lock washer 138 is utilized in conjunction with the projection 132 to retain the flatwire or electronic site 134 on the support structure 130. Finally, FIG. 7e depicts a support structure 140 having a threaded opening 141 formed therein. A threaded fastener 142, which can be constructed of either metal or plastic, can be utilized with the electronic device or flatwire 144 in its preformed hole to retain the component 144 on the support structure 140.

As indicated by these examples, numerous types of fasteners can be employed, including variations of these screws, clips, press-fit pins, and adhesives.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An integrated vehicle structure comprising:
    a vehicle support structure;
    a flatwire extending along the vehicle support structure;
    an electronic site coupled to the flatwire, the electronic site being a flexible circuit board supported on the vehicle support structure; and
    the flatwire and flexible circuit board taking a shape conforming to the surface contours of the vehicle support structure.

2. The integrated vehicle structure of claim 1, wherein the entire electronic site is supported directly on the vehicle support structure.

3. The integrated vehicle structure of claim 1, wherein the electronic site is a rigid circuit board.

4. The integrated vehicle structure of claim 1, wherein the electronic site is integrally formed with the flatwire.

5. The integrated vehicle structure of claim 1, wherein the flatwire forms a wire harness for electrical connection of the electronic site to additional electronic sites.

6. The integrated vehicle structure of claim 1, wherein the vehicle support structure is a cross-car beam.

7. The integrated vehicle structure of claim 1, wherein the vehicle support structure is a hybrid structure having both a metal component and a plastic component, and wherein the electronic site is supported directly on the plastic component.

8. The integrated vehicle structure of claim 7, wherein the plastic component is a support web having a plurality of criss-crossing ribs, and wherein the electronic site is supported directly on the ribs.

9. The integrated vehicle structure of claim 1, further comprising a connector electrically linking the flatwire to an actuator.

10. The integrated vehicle structure of claim 1, further comprising a flatwire tail electrically linking the electronic site to a human machine interface.

11. The integrated vehicle structure of claim 1, further comprising a second electronic site incorporated into the flatwire and being supported on the vehicle support structure.

12. The integrated vehicle structure of claim 11, further comprising a second flatwire extending along the vehicle support structure, the second electronic site being incorporated into the second flatwire.

13. An integrated vehicle structure comprising:
   a vehicle support structure;
   a flatware extending along the vehicle support structure;
   an electronic site coupled to the flatwire, the electronic site being supported on the vehicle support structure; and
   a plurality of fasteners attached to the vehicle support structure, the fasteners sized and arranged to engage the flatwire along its length.

14. The integrated vehicle structure of claim 13, wherein the plurality of fasteners are integrally formed in the vehicle support structure.

15. The integrated vehicle structure of claim 13, wherein the plurality of fasteners include flexible clips.

16. The integrated vehicle structure of claim 13, wherein the plurality of fasteners include projections sized and positioned to correspond with apertures formed in the flatwire.

17. The integrated vehicle structure of claim 16, wherein the projections are constructed of a polymer and are heat staked to secure the flatwire.

18. The integrated vehicle structure of claim 16, wherein the plurality of fasteners further include washers engagable with the projections to secure the flatwire.

19. The integrated vehicle structure of claim 13, wherein the plurality of fasteners include threaded fasteners engagable with corresponding openings in the vehicle support structure.

20. The integrated vehicle structure of claim 13, wherein the vehicle support structure is a hybrid structure having both a metal component and a plastic component, and wherein the electronic site is supported directly on the plastic component.

* * * * *